US006563832B1

(12) United States Patent
Stuart et al.

(10) Patent No.: US 6,563,832 B1
(45) Date of Patent: May 13, 2003

(54) TOKEN RING BRIDGE DISTRIBUTED IN A SWITCHED FABRIC

(75) Inventors: Carson Stuart, Chapel Hill, NC (US); Kevin R. Lingle, Knightdale, NC (US); Claude Alan Cartee, Los Altos, CA (US); Eric Decker, Scotts Valley, CA (US); David A. Carroll, Apex, NC (US); Jeffrey W. Kidd, Hillsborough, NC (US); Kara J. Adams, Raleigh, NC (US); Kenneth H. Potter, Jr., Raleigh, NC (US); Randall G. Campbell, Durham, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/266,239

(22) Filed: Mar. 10, 1999

Related U.S. Application Data

(60) Provisional application No. 60/110,332, filed on Nov. 30, 1998.

(51) Int. Cl.[7] .............................................. H04L 12/417
(52) U.S. Cl. ..................... 370/403; 370/406; 370/408
(58) Field of Search ................................. 370/401, 402, 370/403, 404, 405, 406, 407, 408, 450, 451, 452, 463, 254, 255, 256, 257, 258

(56) References Cited

U.S. PATENT DOCUMENTS 4,823,338 A    4/1989   Chan et al. ................... 370/85
4,864,559 A    9/1989   Perlman ........................ 370/60
5,018,133 A    5/1991   Tsukakoshi et al. ........... 370/16
5,027,250 A    6/1991   Marshall ..................... 370/85.13
5,088,032 A    2/1992   Bosack ........................ 395/200
5,088,090 A    2/1992   Yacoby ....................... 370/85.13
5,095,480 A    3/1992   Fenner ........................ 370/94.1
5,111,453 A    5/1992   Morrow ...................... 370/85.13

(List continued on next page.)

OTHER PUBLICATIONS

Overview of Token Ring Switching, Web, http://www.cisco.com/univercd/cc/td/doc/product/lan/trsrb/overview.htm, Oct. 8, 1998, pp. 1–8.

Radia Perlman, *Interconnections: Bridges and Routers*, 1992, pp. 99–125.

Andrew S. Tanenbaum, *Computer Networks, Third Edition*, 1996, pp. 275–318.

Annex K—DTR Concentrator Functional Description, Jul. 31, 1995, pp. K–1–K–22.

(List continued on next page.)

*Primary Examiner*—Min Jung
(74) *Attorney, Agent, or Firm*—Cesari and McKenna, LLP

(57) ABSTRACT

A distributed token ring (TR) bridge has a logical switch fabric that is distributed over a TR switching network of switches interconnected by trunk links. The distributed TR bridge includes a plurality of TR switches, each having a Bridge Relay Function (BRF) logically coupled to at least one Concentrator Relay Function (CRF). Distribution of the switch fabric essentially comprises logically distributing the BRF function among the network of switches.

31 Claims, 12 Drawing Sheets

U.S. PATENT DOCUMENTS

| | | | | |
|---|---|---|---|---|
| 5,144,622 | A | | 9/1992 | Takiyasu et al. .......... 370/85.13 |
| 5,280,480 | A | | 1/1994 | Pitt et al. ................. 370/85.13 |
| 5,309,437 | A | | 5/1994 | Perlman et al. .......... 370/85.13 |
| 5,323,394 | A | | 6/1994 | Perlman .................... 370/85.13 |
| 5,331,637 | A | | 7/1994 | Francis et al. ................ 370/54 |
| 5,353,283 | A | | 10/1994 | Tsuchiya ..................... 370/60 |
| 5,394,402 | A | | 2/1995 | Ross ......................... 370/94.1 |
| 5,408,618 | A | * | 4/1995 | Aho et al. ................... 710/104 |
| 5,414,704 | A | | 5/1995 | Spinney ....................... 370/60 |
| 5,442,633 | A | | 8/1995 | Perkins et al. ............. 370/94.1 |
| 5,444,692 | A | * | 8/1995 | Basso et al. ................ 370/258 |
| 5,448,565 | A | | 9/1995 | Chang et al. ............. 370/85.13 |
| 5,491,687 | A | | 2/1996 | Christensen et al. .......... 370/17 |
| 5,500,860 | A | | 3/1996 | Perlman et al. .......... 370/85.13 |
| 5,511,168 | A | | 4/1996 | Perlman et al. ........ 395/200.15 |
| 5,517,620 | A | | 5/1996 | Hashimoto et al. .... 395/200.15 |
| 5,583,996 | A | | 12/1996 | Tsuchiya ............... 395/200.15 |
| 5,600,644 | A | | 2/1997 | Chang et al. ............... 370/404 |
| 5,617,421 | A | | 4/1997 | Chin et al. .................. 370/402 |
| 5,623,532 | A | | 4/1997 | Houde et al. ................ 379/58 |
| 5,633,858 | A | | 5/1997 | Chang et al. ............... 370/255 |
| 5,633,866 | A | | 5/1997 | Callon ........................ 370/397 |
| 5,684,800 | A | | 11/1997 | Dobbins et al. ............ 370/401 |
| 5,740,171 | A | | 4/1998 | Mazzola et al. ............ 370/392 |
| 5,742,604 | A | | 4/1998 | Edsall et al. ................ 370/401 |
| 5,752,003 | A | | 5/1998 | Hart ............................ 395/500 |
| 5,764,636 | A | | 6/1998 | Edsall ........................ 370/401 |
| 5,796,732 | A | | 8/1998 | Mazzola et al. ............ 370/362 |
| 5,818,842 | A | | 10/1998 | Burwell et al. ............. 370/397 |
| 5,828,844 | A | | 10/1998 | Civanlar et al. ....... 395/200.58 |
| 5,852,607 | A | | 12/1998 | Chin .......................... 370/401 |
| 5,872,783 | A | | 2/1999 | Chin .......................... 370/392 |
| 5,898,686 | A | | 4/1999 | Virgile ....................... 370/381 |
| 5,909,441 | A | | 6/1999 | Alexander, Jr. et al. .... 370/395 |
| 5,909,550 | A | | 6/1999 | Shankar et al. ........ 395/200.57 |
| 6,304,575 | B1 | * | 10/2001 | Carroll et al. .............. 370/408 |

OTHER PUBLICATIONS

Configuring VTP and Virtual LANs, Cisco Systems, Inc., Feb. 27, 1998, pp. 13-1–13-24.

A New Protocol For Route Discovery In Multiple–Ring Networks: Part I—The Basic Protocol, Reuven Cohen, Jun. 25, 1997, pp. 488–498.

The IBM 8209 LAN Bridge, Aamer Latif, Edward J. Rowlance, and R. Holt Adams, May 1992, pp. 28–37.

Understanding Token Ring Switching, Web, http://www.cisco.com/univercd/cc/tduct/lan/cat3900/c393ug/token.htm, Oct. 8, 1998, pp. 1–22.

Token Ring Inter–Switch Link Feature Summary, web, http://www.cisco.com/univercd/cc/tare/ios113ed/113t/113_4/trisl.htm, Oct. 8, 1998, pp. 1–26.

Draft Standard for Virtual Bridged Local Area Networks, LAN MAN Standards Committee, Feb. 1997, pp. 1–88.

Cisco VLAN Roadmap, web http://www.cisco.com/warp/public/538/7.htm, Jul. 15, 1998, pp. 1–9.

Cisco Announces Token–Ring Switching Products, Apr. 15, 1995, pp. 4–5.

* cited by examiner

| VLAN ID 910 | BRF BN 912 | CRF RN 914 |
|---|---|---|
|  |  |  |
|  |  |  |
| ⋮ | ⋮ | ⋮ |
|  |  |  |

SOURCE VLAN ID 902

| VALID 1010 | CRF VLAN ID 1012 |
|---|---|
|  |  |
|  |  |
| ⋮ | ⋮ |
|  |  |

CRF RN 1002

TABLE 1

| CRF-TO-BRF BRIDGE MODE | DEST VLAN | DEST ADDR | SRC VLAN | SRC ADDR |
|---|---|---|---|---|
| SRT | BRF | DA | BRF | SA |
| SRB | PORT'S CRF | DA | PORT'S CRF | SA |

FIG. 12

TABLE 2

| RING#'S IN RIF (N) | PORT RING# POSITION IN RIF (X) | ANY OTHER CRF'S RING# IN RIF? | DEST VLAN | DEST ADDR | SRC VLAN | SRC ADDR |
|---|---|---|---|---|---|---|
| 0 | - | - | BRF | - | PORT'S CRF | SA |
| >0 | NOT FOUND | - | (DISCARD) | | | |
| >0 | NOT N | - | (DISCARD) | | | |
| 1 | 1 | - | BRF | - | PORT'S CRF | SA |
| >1 | N | YES | PORT'S CRF | - | PORT'S CRF | RING# N-I |
| >1 | N | NO | PORT'S CRF | - | PORT'S CRF | RING# N-I |
| >1 | N | NO | BRF | - | PORT'S CRF | RING# N-I |

FIG. 13

TABLE 3

| NUMBER OF RING#'S IN RIF (N) | PORT RING# POSITION IN RIF (X) | CRF-TO-BRF SPANNING TREE FWDING? | DEST VLAN | DEST ADDR | SRC VLAN | SRC ADDR |
|---|---|---|---|---|---|---|
| 0 | - | NO | PORT'S CRF | - | PORT'S CRF | SA |
| 0 | - | YES | BRF | - | PORT'S CRF | SA |
| >0 | NOT FOUND | - | | (DISCARD) | | |
| >0 | NOT N | - | | (DISCARD) | | |
| 1 | 1 | NO | PORT'S CRF | - | PORT'S CRF | SA |
| 1 | 1 | YES | BRF | - | PORT'S CRF | SA |
| >1 | N | NO | PORT'S CRF | - | PORT'S CRF | RING# N-I |
| >1 | N | YES | PORT'S CRF | - | PORT'S CRF | RING# N-I |
| >1 | N | YES | BRF | - | PORT'S CRF | RING# N-I |

FIG. 14

TABLE 4

| NUMBER OF RING#'S IN RIF (N) | PORT RING# POSITION IN RIF (X) | PORT'S BRF BRIDGE# IN POSITION X+1? | ANOTHER CRF'S RING# IN POSN X+1? | DEST VLAN | DEST ADDR | SRC VLAN | SRC ADDR |
|---|---|---|---|---|---|---|---|
| 0 | - | - | - | PORT'S CRF | DA | PORT'S CRF | SA |
| 1-14 | NOT FOUND | - | - | (DISCARD) | | | |
| 1 | - | - | - | (DISCARD) | | | |
| 2-14 | 1 | NO | - | PORT'S CRF | RD 2 | PORT'S CRF | SA |
| 2-14 | 1 | YES | NO | PORT'S CRF | RD 2 | PORT'S CRF | SA |
| 2 | 1 | YES | YES | RD 2'S CRF | DA | PORT'S CRF | SA |
| 3-14 | 1 | YES | YES | RD 2'S CRF | RD 3 | PORT'S CRF | SA |
| 2-14 | N | - | - | PORT'S CRF | DA | PORT'S CRF | RD X-1 |
| 3-14 | 2 THRU (N-1) | NO | - | PORT'S CRF | RD X+1 | PORT'S CRF | RD X-1 |
| 3-14 | 2 THRU (N-1) | YES | NO | PORT'S CRF | RD X+1 | PORT'S CRF | RD X-1 |
| 3-14 | (N-1) | YES | YES | RD N'S CRF | DA | PORT'S CRF | RD X-1 |
| 3-14 | 2 THRU (N-2) | YES | YES | RD X+1'S CRF | RD X+2 | PORT'S CRF | RD X-1 |

FIG. 15

TOKEN RING BRIDGE DISTRIBUTED IN A SWITCHED FABRIC

REFERENCE TO PROVISIONAL APPLICATION

This patent application claims the benefit under 35 U.S.C. §119(e) of U.S. Provisional Patent Application No. 60/110,332 titled, Distributed Token Ring Bridge Architecture, by Carson Stuart et al. and filed on Nov. 30, 1998, which application is hereby incorporated by reference as though fully set forth herein.

CROSS-REFERENCE TO RELATED APPLICATIONS

This invention is related to the following copending U.S. Patent Applications:

U.S. patent application Ser. No. 09/266,198 titled, Backup CRF VLAN; and

U.S. patent application Ser. No. 09/265,668 titled, Switched Token Ring over ISL (TR-ISL) Network; and U.S. patent application Ser. No. 09/266,241 titled, Distributed Ring Protocol and Database, each of which was filed on even date herewith and assigned to the assignee of the present invention.

BACKGROUND OF THE INVENTION

Communication in a computer internetwork involves the exchange of data between two or more entities interconnected by communication media configured as local area networks (LANs) and wide area networks (WANs). The entities are typically software programs executing on hardware computer platforms, such as end stations and intermediate stations. In particular, communication software executing on the end stations correlate and manage data communication with other end stations. The stations typically communicate by exchanging discrete packets or frames of data according to predefined protocols. A protocol, in this context, consists of a set of rules defining how the stations interact with each other. For example, a LAN employs a data communication protocol (LAN standard), such as Token Ring, Ethernet or Token Bus, that defines the functions performed by the data link and physical layers of a communications architecture (i.e., a protocol stack).

To form a WAN, one or more intermediate devices are often used to interconnect multiple LANs. A bridge is an example of an intermediate station that may be used to provide a "bridging" function between two or more LANs to form a relatively small domain of stations, such as a subnetwork. Subnetworks or subnets provide an organizational overlay to an internetwork that facilitates transmission of data between the end stations. A switch may be utilized to provide a "switching" function for transferring information, such as data frames, between LANs. Typically, the switch is a computer having a plurality of ports that couple the switch to several LANs and to other switches. The switching function includes receiving data frames at an inbound port and transferring them to at least one outbound port of the switch. A router is an intermediate station that interconnects subnets and executes network routing software to allow expansion of communication to end stations of other subnets. Collectively, these hardware and software components comprise a communications internetwork.

FIG. 1 is a schematic block diagram of a conventional Token Ring (TR) internetwork 100 comprising a plurality of TR LANs interconnected by conventional bridges and a router (R). Each token ring is assigned a ring number (RN), such as RN001, RN222 and RN123, and each bridge is assigned a bridge number (BN), such as BN1–3. The RNs assigned to the token rings must be unique within each bridged TR subnetwork that extends to the router. That is, RNs assigned to the token rings within each subnetwork must be different, although BNs assigned to the bridges within each subnetwork may be similar. An exception to this latter rule involves the use of redundant bridges coupling common TR LANs; here, the redundant bridges must have unique BNs in order to distinguish one another.

In the TR internetwork, there may be multiple paths between a source end station and a destination end station. To send a TR frame from a source (such as Station A) to a destination (such as Station B) along a particular path of the internetwork, the source may insert information within a routing information field (RIF) of the frame that specifies the particular path to the destination. FIG. 2 is a schematic diagram of a portion of a conventional TR frame 200 comprising destination address (DA) and source address (SA) medium access control (MAC) fields 202–204 and a RIF header 210. The RIF header 210, in turn, comprises a type (TYPE) field 212, a RIF length indicator (LENGTH) field 214, a direction bit (DIRECTION) field 216 and a ROUTE field 220 that may include a plurality of RN/BN pairs needed to describe the path. Each RN/BN pair comprises 2 bytes, wherein the RN is 12 bits and the BN is 4 bits. The RIF header 210 terminates with a 4-bit padding (PAD) field 228 of zeros.

The source typically acquires the information for insertion into the RIF through the issuance of a special TR frame called an All Routes Explorer (ARE) frame that is broadcasted throughout the TR subnetwork. An ARE frame is typically used to find all paths to a particular destination; an example of a frame used to strictly find the destination is a Spanning Tree Explorer (STE) frame. The STE frame only propagates over network segments that are along a defined spanning tree path to the destination; consequently, the destination only receives one copy of the frame. Execution of a spanning tree algorithm within the bridges results in blocking of certain ports to obviate propagation of frames around loops.

Source Route Bridging (SRB) describes a bridging technique that forwards TR frames based on the RIF information stored in the frame; an example of a frame that has a RIF is called a Specifically Routed Frame (SRF). In contrast, Transparent Bridging (TB) is a bridging technique that forwards TR frames based on their MAC addresses using a forwarding table. Source Route Transparent (SRT) bridging is a merging of the SRB and TB techniques; that is, if there is a RIF in the frame transported over an SRT bridge network, forwarding decisions are based on that RIF, whereas if there is no RIF in the frame, forwarding decisions are made based on the MAC address of the frame using the forwarding table. A TR frame that does not have a RIF is called a Non-Source Route (NSR) frame.

When issuing an ARE frame, the source (Stn A) initially sets the RIF length 214 to "2" (the length of the header 210) signifying that there is no information contained in the route field 220 of the RIF, and loads the type field 212 of the header with information specifying the type of frame, e.g., an ARE frame. Stn A then transmits the ARE frame over token ring RN001 where it is received by each station, including each bridge, connected to the token ring. Upon receiving the frame, each bridge inserts information into the RIF prior to forwarding a copy of the ARE frame onto its connected token ring.

In general, each bridge inserts into the RIF (i) its bridge number and (ii) the ring number of the token ring to which it is forwarding the frame; however, when a bridge receives an ARE frame having a RIF length of "2", the bridge also inserts into the RIF the ring number of the token ring from which the frame is received. For example, a first BN1 inserts into the RIF the following information: the RN of the token ring from which the frame is received, its BN and the RN of the ring to which it is forwarding the frame <001.1.123>. The contents of the RIF thus describe the path followed by the ARE frame to reach token ring RN123.

The RIF contents for other copies of the ARE frame broadcasted throughout the TR subnetwork include (i) RIF= <001.1.222> and (ii) RIF=<001.2.222>. These copies of the ARE frame are forwarded over RN222 and the bridges connected to the ring update the RIF of the ARE frames prior to forwarding them to their connected LANs. For example when bridge BN3 forwards the ARE frame to RN123, it updates the RIF header 210, including the length field 214, as a result of inserting its bridge number and connected ring number into the RIF. Thus, the contents of the RIF of an ARE frame propagating over RN123 are <001.1.222.3.123>. Destination (Stn B) receives three ARE frames, one of which has a RIF with contents <001.1.123>, another having RIF contents <001.1.222.3.123> and a third having RIF contents of <001.2.222.3.123>.

Stn B chooses one of the ARE frames (and its RIF contents) as the route over which it returns a response frame; typically, the destination chooses the frame it received first, which may be the frame having the shortest RIF to the source. Stn B thus returns a SRF frame to the source over a path <001.1.123> specified in the RIF. The frame type is indicated as a SRF frame and the direction bit is altered to enable interpretation of the contents of the RIF. In the case of a response frame, the direction bit is inverted to denote that the RIF contents are interpreted in a reverse direction to describe the path to the source.

In general, a properly functioning bridge does not forward a copy of a STE frame or an ARE frame back over a token ring from which it has already traversed. When the ARE frame is "flooded" over RN001, one copy of the frame is received by bridge BN2 and forwarded to RN222, while another copy of the frame is received at a second BN1 and forwarded to RN222. Because each of these bridges reside on the same token ring, the copy of the frame forwarded over RN222 from BN2 is received by BN1 and, similarly, the copy of the frame forwarded over RN222 by BN1 is received by BN2. Yet, those bridges do not forward copies of the frames back onto RN001 because the ARE frames previously traversed that ring. Specifically, BN1 examines the contents of the RIF and, upon detecting that the ARE frame had previously traversed RN001, blocks its port to that token ring. Blocking of the port effectively discards the frame and prevents it from circulating endlessly around a loop, while also preventing end stations from receiving multiple copies of the frame.

A token ring network is typically implemented through the use of TR concentrators (or "hubs") interconnected in a "daisy chain" manner, wherein each concentrator is coupled to end stations via point-to-point wire cables 310. FIG. 3 is a schematic diagram of a conventional TR concentrator network arrangement 300. Collectively, the interconnected concentrators 302–308 form a physical loop/ring configuration that starts at a first TR concentrator 302 and continues through each end station coupled to the concentrator; this configuration extends to each connected TR concentrator up to a last concentrator 308, where it "loops-back" to the first concentrator. Access to the ring is determined in accordance with a token message that propagates among all of the end stations coupled to the ring. A problem with this conventional network arrangement involves the limited bandwidth available to each station over the cables 310; for example, all stations coupled to the physical token ring share 16 megabits per second (Mbps) of bandwidth. In contrast, intermediate stations (switches) in an Ethernet environment are interconnected by 100 Mbps "pipes" that increase the bandwidth available per station.

One way to achieve additional bandwidth in a token ring environment is to apportion the token ring into smaller subrings, each of which is coupled to a bridge. Yet, apportioning a token ring network into subrings requires careful consideration because of the limitations associated with token ring networks. Since each ring number comprises 12 bits, there is only a finite number of ring numbers available per subnet. The total length of the RIF of a TR frame is less than or equal to 30 bytes, thus limiting the RIF to a total of fourteen (14) RN/BN pairs for the typical TR frame 200. Moreover, subrings do not generally scale well for modem networking environments wherein each server coupled to the network requires its own TR concentrator to achieve necessary bandwidth requirements.

Another approach to increasing bandwidth in a token ring environment involves the use of intermediate stations that are compatible with the Dedicated Token Ring (DTR) bridge standard promulgated by the Institute of Electrical and Electronics Engineers (IEEE) in Annex K to the IEEE 802.5 standard (hereinafter "Annex K"), which is governs token ring LANs. Annex K defines a 2-tier switching model for a single LAN switch containing a Bridge Relay Function (BRF) to bridge between ports of different ring numbers and a Concentrator Relay Function (CRF) to switch between ports of the same ring number.

FIG. 4 is a schematic diagram of a switch 400 containing a plurality of CRFs (CRF111–333) coupled to a BRF1 to provide bridging and switching operations among physical token ring (TR) media/segments coupled to the switch. Each CRF has a plurality of ports that interconnect a plurality of TR segments into one logical token ring having a single ring number. This arrangement is advantageous because it increases the total available bandwidth per logical token ring. That is, for a 4-port switch arrangement, a total of 64 Mbps of bandwidth is available for, e.g., CRF111.

Functionally, the CRF "switches" TR frames from one TR segment to another, while the BRF "bridges" those frames between different CRFs. That is, rather than or in addition to forwarding frames from one TR segment to another, CRF111 may pass them to its associated BRF1 which may, in turn, forward the frames to CRF222. CRF222 may then forward the frames over one of its TR segments. Thus, the 2-tier switching model allows BRF1 to transfer TR frames between different logical token ring numbers.

FIG. 5 is a schematic block diagram of a conventional bridging arrangement 500 comprising a plurality of switches SW1–2 with a plurality of BRFs (BRF1–3), each of which is coupled to a plurality of CRFs. In general, coupling of a BRF to the CRFs forms a subnetwork; multiple subnetworks may then be interconnected by a router (R) located internal (or external) to a switch. However, a CRF may be extended from one physical location to another using a wire 510 that connects one port of the CRF in a switch to another port of the CRF in another switch.

For example, CRF222 may be defined in each switch SW1–2 and its function logically extended between the switches by coupling two ports through the wire 510. Although this enables its ports to occupy a single logical ring number, CRF222 is logically coupled between two different BRFs (BRF1 and BRF2). Each BRF in the switches has an assigned bridge number (BN) and constitutes a bridge hop. Notably, the wire 510 used to couple the CRF ports of the switches SW1–2 is generally similar to the cable 310 coupling stations/concentrators of a token ring and, thus, supports 16 Mbps of bandwidth.

It is apparent that CRFs and BRFs are logical constructs that may be variously configured and defined to perform bridging and switching operations when forwarding frames. For example, multiple CRFs can be logically configured to one or more BRFs (using wires to interconnect CRF ports) to form a subnetwork. However, in a large campus environment having many switches interconnected by such wires, the maximum number of RN/BN pairs in a RIF of a TR frame would be quickly exhausted since each BRF is a hop that consumes a bridge number. The ring and bridge numbers of a subnetwork, along with length of the RIF of a TR frame, are critical resources of a token ring environment. The present invention is directed, in part, to reducing the number of hops in a network and conserving the RIF of a TR frame. Annex K describes two or more BRF functions within a single switch; the invention described herein is further directed to logically extending a BRF function between different, physically-disperse switches.

SUMMARY OF THE INVENTION

The invention comprises a distributed token ring (TR) bridge having a logical switch fabric that is distributed over a TR switching network of switches interconnected by trunk links. The distributed TR bridge includes a plurality of TR switches, each having a Bridge Relay Function (BRF) logically coupled to at least one Concentrator Relay Function (CRF). According to the invention, distribution of the switch fabric essentially comprises logically distributing the BRF function among the network of switches.

In the illustrative embodiment, each switch of the distributed TR bridge comprises port and trunk interface circuitry. The port interface circuitry includes a plurality of TR ports that interconnect a plurality of TR media segments, whereas the trunk interface circuits are interconnected by the trunk links. The distributed TR bridge further comprises BRF/CRF constructs "overlayed" onto the platform circuitry to create a logically-defined relationship among the ports and CRFs, and among the switches and distributed BRF switch fabric.

The port interface circuitry is further coupled to a modified forwarding table and a CRF table, whereas the trunk interface circuitry is coupled to a virtual local area network (VLAN) table in addition to the modified forwarding table and CRF table. The VLAN table is used by the trunk interface circuitry to acquire information such as CRF VLAN identifiers (IDs) pertaining to TR frames flowing through the circuitry. The CRF table provides information such as a VLAN ID corresponding to a CRF ring number, while the modified forwarding table is used by the port and trunk interface circuits to select a destination port or ports for receiving a TR frame.

Inbound frame parsing operations, along with inbound frame forwarding operations, for an incoming TR frame are rendered at the port or trunk interface circuitry of an inbound port receiving the frame. The inbound frame forwarding operations comprise both learning and destination selection (i.e., forwarding decision) operations. The forwarding decision rendered by the port interface circuitry may be carried over the trunking link (if necessary) to the distributed portions of the TR switching bridge environment. In addition, outbound frame processing operations are performed by an outbound port when the incoming frame is copied to that latter port.

An advantage of the present invention is a reduction in the number of bridge "hops" in a network. By distributing a BRF switch fabric among multiple switches, the number of hops between end stations coupled to CRFs within different switches is reduced. A reduction in the number of bridge hops also conserves the routing information field of a TR frame. Another advantage of the present invention is that high-speed trunks, rather than 16 Mbps TR port wires, can be used to interconnect the switches of the distributed bridge.

BRIEF DESCRIPTION OF THE DRAWINGS

The above and further advantages of the invention may be better understood by referring to the following description in conjunction with the accompanying drawings in which like reference numbers indicate identical or functionally similar elements:

FIG. 9 is a schematic diagram of a virtual local area network (VLAN) table used by the trunk interface circuitry to acquire information pertaining to TR frames flowing through the circuitry in accordance with the present invention;

FIG. 10 is a schematic diagram of a CRF table according to the present invention;

FIG. 12 is a schematic diagram of Table 1 which summarizes the activity involved in processing incoming Non-Source Route (NSR) TR frames received at a switch of the distributed TR bridge;

FIG. 13 is a schematic diagram of Table 2 which summarizes the activity involved in processing incoming All Routes Explorer (ARE) frames received at a switch of the distributed TR bridge;

FIG. 14 is a schematic diagram of Table 3 which summarizes the activity involved in processing incoming Spanning Tree Explorer (STE) frames received at a switch of the distributed TR bridge;

FIG. 15 is a schematic diagram of Table 4 which summarizes the activity involved in processing incoming Specifically Routed Frames (SRF) received at a switch of the distributed TR bridge.

DETAILED DESCRIPTION OF AN ILLUSTRATIVE EMBODIMENT

Figure 6:
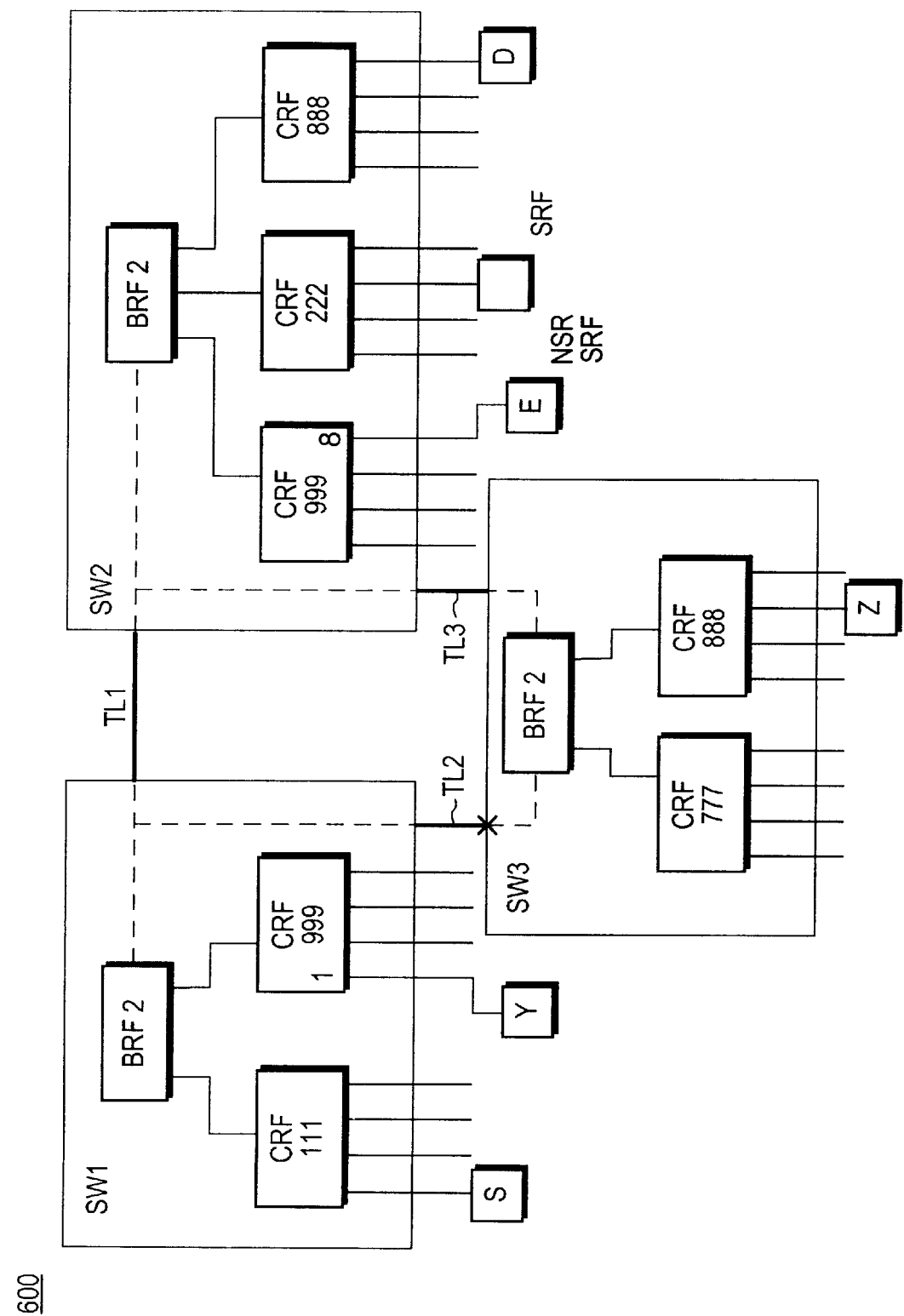
FIG. 6 is a schematic diagram of a TR bridge distributed in a switched fabric according to the invention.

FIG. 6 is a schematic diagram of a token ring (TR) bridge distributed in a switched fabric according to the invention. The distributed TR bridge 600 includes three TR switches SW1–3, each having a Bridge Relay Function (BRF) logically coupled to a plurality of Concentrator Relay Functions (CRFs); moreover, each CRF has TR ports associated therewith. The physical relationship between ports and bridges in a conventional bridging environment is effectively transformed into a logical relationship between CRFs and BRFs in the distributed TR switching environment. Thus, for the novel distributed TR bridge 600, multiple ports may be associated with a particular ring (CRF) while multiple switches (SWs) may be associated with a particular bridge (BRF).

As described herein, a frame that is received on an inbound CRF port of a switch is "switched-out" one or more output ports of the switch; the BRF/CRF functions in the distributed bridge environment define those ports through which copies of the frame are bridged/switched. The BRF and CRF are defined by the IEEE 802.5 Annex K standard which describes a single switch implementation of BRFs logically coupled to CRFs. The distributed bridging environment of the present invention distributes that single switch implementation in a switched fabric across multiple switches. Distribution of the switch fabric essentially comprises logically distributing the bridging (BRF) function among a network (mesh) of switches.

Specifically, the BRF function (denoted BRF2) is logically distributed across switches SW1–3 so as to create a single BRF distributed switch fabric that spans a plurality of (e.g., three) physically distinct locations. Instead of having a non-disperse BRF in each switch (as described in Annex K), the invention provides extending the function of a particular BRF among multiple switches in a distributed manner. The distributed BRF environment may be further extended to include a distributed CRF arrangement. Although there may be multiple physical rings coupled to a CRF, the CRF defines a single RN and the multiple physical rings are logically associated as a single ring. Thus, a CRF (e.g., CRF999) contained within a switch (e.g., SW1) may be distributed among at least one other switch (e.g., SW2). Physical token rings are coupled to each CRF such that only end stations (users) need be associated with each ring.

Figure 5:
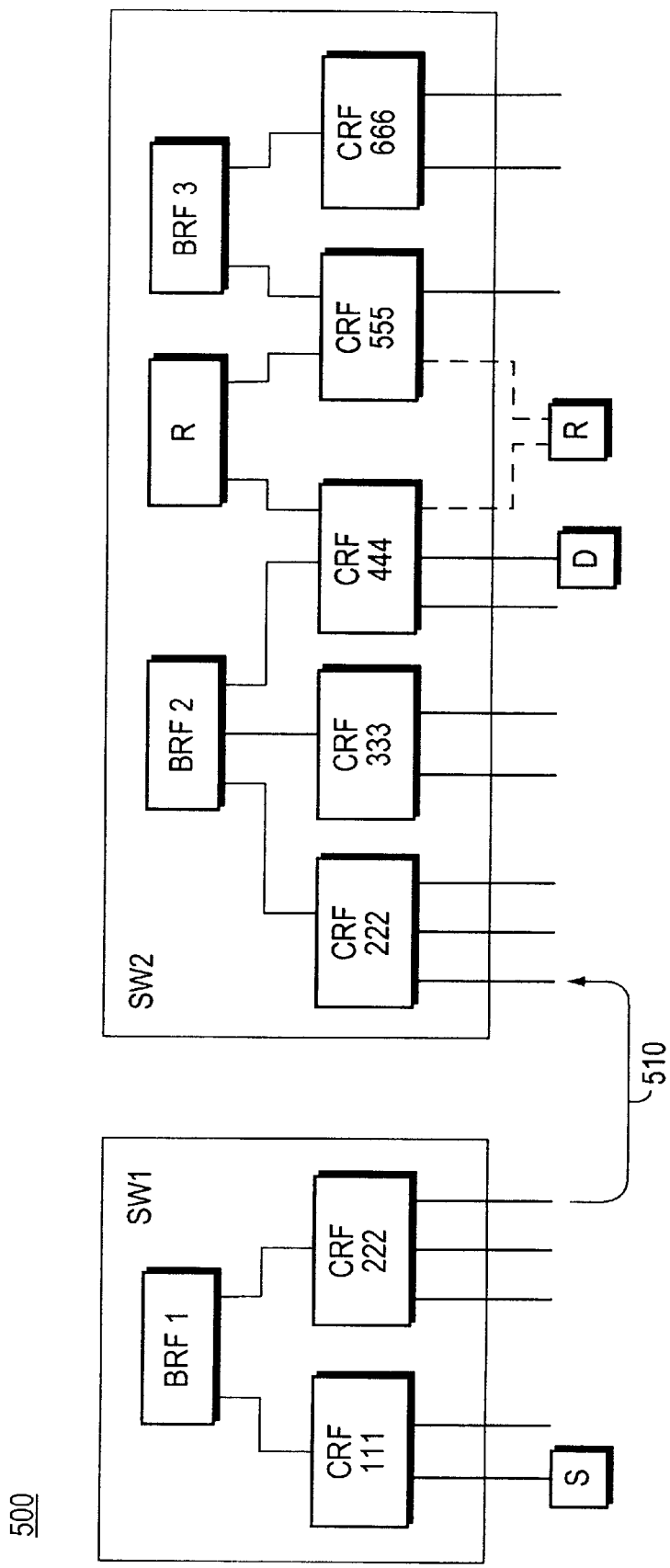
FIG. 5 is a schematic block diagram a conventional bridging arrangement comprising a plurality of switches with a plurality of BRFs, each of which is coupled to a plurality of CRFs.

As noted, a motivation for the distributed TR bridge invention is the elimination of bridge "hops". Each BRF in each switch has a bridge number (BN) and, thus, constitutes a bridge hop; for a large campus environment having many switches interconnected by trunking links, the maximum number of ring number (RN)/BN pairs in a routing information field (RIF) of a TR frame would be quickly exhausted. Rather than having to traverse a plurality of bridge hops to transport a frame from source station S coupled to CRF111 to destination station D coupled to CRF444 (FIG. 5, wherein RIF=111.1.222.2.444), the distributed BRF invention reduces the number of bridge hops such that, in FIG. 6, the RIF between S and D comprises <111.2.888>. Thus, in addition to reducing the number of hops in a network, the distributed bridge invention also conserves the RIF of a TR frame.

Figure 7:
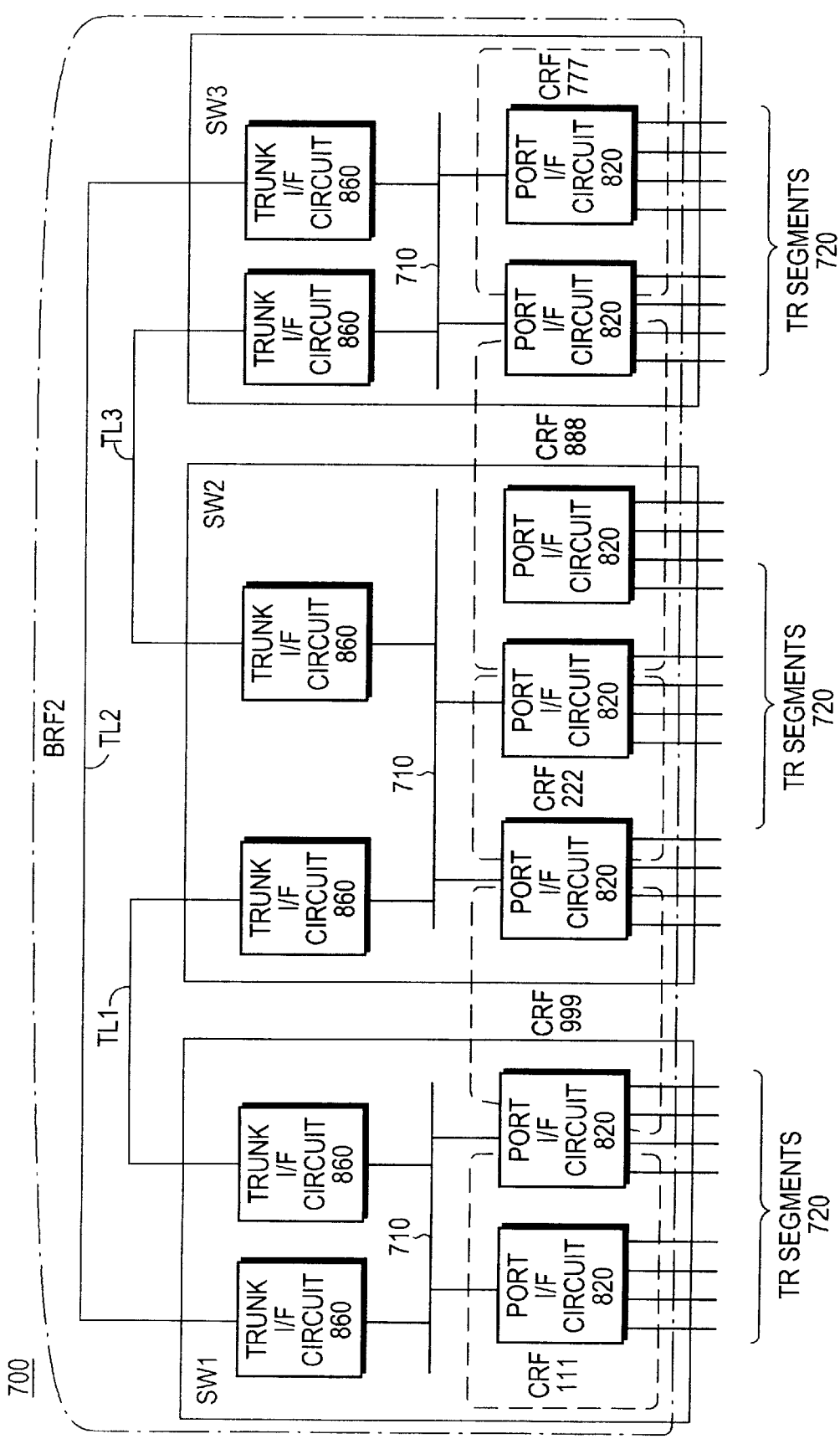
FIG. 7 is a schematic block diagram of an illustrative embodiment of a network switch platform having a plurality of switches configured as a distributed TR bridge in accordance with the present invention.

FIG. 7 is a schematic block diagram of an illustrative embodiment of a network is switch platform configured as a distributed TR bridge 700. The distributed bridge platform comprises three switches SW1–3, each including port interface (I/F) circuitry 820 and trunk interface (I/F) circuitry 860 interconnected by a bus 710. The port interface circuitry 820 includes a plurality of TR ports that interconnect a plurality of TR media segments 720, whereas the trunk interface circuitry 860 are interconnected by trunk links TL1–3. The distributed bridge further comprises BRF/CRF constructs "overlayed" onto the platform circuitry to create a logically-defined relationship among the ports and CRFs, and among the switches and distributed BRF.

According to the invention, the port interface circuits are organized and defined as CRF111, 999, 222, 888 and 777, whereas the interconnected port and trunk interface circuits are organized and defined as a Bridge Relay Function (BRF) that is distributed among the switches SW1–3 to create a single logical switch fabric. An example of a network switch platform that may be advantageously used in the distributed TR switching (bridge) environment described herein is disclosed in conmmonly-assigned U.S. patent application Ser. No. 09/106,245, titled Pooled Receive and Transmit Queues to Access a Shared Bus in a Multi-Port Switch ASIC, by Scott Nellenbach et al., file on Jun. 29, 1998, now issued as U.S. Pat. No. 6,356,548 which application is incorporated herein as though fully set forth herein.

Aspects of the distributed bridge invention described further herein include (i) configuration information (e.g., BN/BRF numbers, RN/CRF numbers logically coupled to a BRF) pertaining to the individual switching/bridging components of the switches that cooperate to provide the distributed switch fabric; and (iii) a linking apparatus that "internally" extends the switching fabric of the distributed bridge between the physically distinct switches. The linking apparatus is preferably a trunking mechanism extending between multiple BRFs (or, alternatively, between multiple CRFs) that are physically located in multiple separate switches. That is, unlike the conventional approach that utilizes a wire (configured to support only 16 Mbps of bandwidth) to couple CRF ports of two switches, the switches SW1–3 may be interconnected by point-to-point trunking links TL1–3 capable of providing approximately 100 Mbps or greater of bandwidth performance. A conventional spanning tree protocol is executed by each switch to obviate the formation of loops by the trunking links TL1–3 interconnecting the switches.

The trunking mechanism may comprise any type of physical link and associated trunking protocol capable of carrying certain TR-specific information, such as a source CRF RN, in addition to the incoming bridged/switched frame. The physical link may be configured as a local area network (LAN) or wide area network (WAN) link. Examples of a trunking mechanism that may be advantageously used with the present invention are described in commonly-assigned U.S. Pat. No. 5,742,604, titled Interswitch Link Mechanism for Connecting High-Performance Network Switches, by Edsall et al. (the "'604 patent"), and copending and commonly assigned U.S. patent application Ser. No. 09/265,668, titled Switched Token Ring over ISL Network (TR-ISL), which application is hereby incorporated by reference as though fully set forth herein.

The invention supports source route bridging (SRB) and/or source route transparent bridging (SRT) operations between physical token rings of the distributed bridge environment. Any BRF or CRF, including the physical token rings coupled to the CRF, may be located in any switch coupled to the distributed bridge. When configuring the distributed bridge, the BRF BN within each switch is initially defined and the CRF RNs associated with the BRF are defined. From a configuration point of view, ports are associated with a CRF and CRFs are associated with a BRF. For example, rings/ports coupled to CRF222 may be physically coupled to SW2, yet may be also logically associated with SW1,3. This configuration information is provided to all of the BRFs associated with the distributed TR bridge.

Distributing a BRF function among different switches requires "knowledge" on behalf of the BRF of those CRFs that are associated with the bridging function, yet that reside on the different switches. For example, BRF2 on SW1 must be aware that it is logically associated with CRF222 on SW2 and BRF2 on SW2 must be aware that it is logically associated with CR111 on SW1. Typically, a conventional bridge acquires such knowledge through configuration management capabilities that provide configuration information such as the bridge number of the bridge, the bridging type of the bridge, the ring numbers associated with the bridge and the medium access control (MAC) address of the bridge. Likewise, configuration information such as the BRF number, bridging type of the BRF, MAC address of the BRF and CRF numbers associated with the BRF need to be provided to the components of the distributed TR bridge. According to the invention, such configuration information is contained in forwarding tables that have been modified to enable practicing of the present distributed BRF bridging invention.

The configuration information contained in the modified forwarding tables may be manually configured within each switch or it may be configured through a configuration synchronization protocol, such as a conventional virtual local area network (VLAN) trunking protocol (VTP). That is, a protocol may be used to transport the configuration information stored in the modified tables over the trunking links among the switches to enable update/synchronization of their configuration information. For example, if CRF111 is added to SW1, the configuration synchronization protocol facilitates transporting of that configuration information from SW1 over the link TL1 to SW2 so that BRF2 on SW2 can update its configuration information with the newly added CRF function. As a result of the update, the distributed BRF2 in SW2 only has knowledge that CRF111 is logically coupled to it; it has no knowledge as to the status of that CRF's ports; i.e., whether there is anything active on the rings coupled to the ports. An example of a protocol and database that distributes and maintains status information of ports and that may be advantageously used with the present invention is described in copending and commonly assigned U.S. patent application Ser. No. 09/266,241, titled Distributed Ring Protocol, which application is hereby incorporated by reference as though fully set forth herein.

Figure 8:
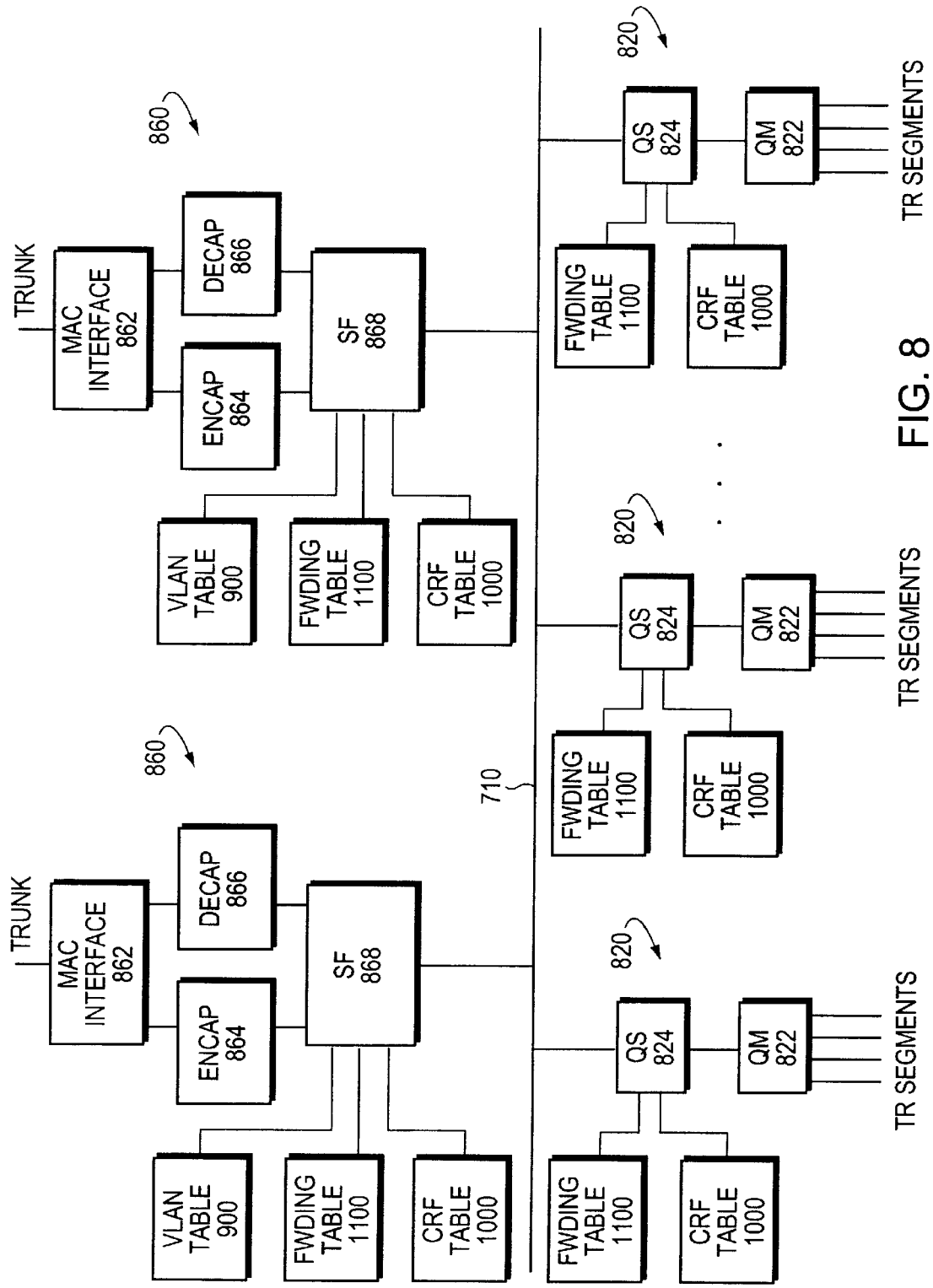
FIG. 8 is a schematic block diagram of trunk and port interface circuitry contained within each switch of the distributed TR bridge.

FIG. 8 is a schematic block diagram of the port interface circuitry 820 and trunk interface circuitry 860 of each switch. In the illustrative embodiment, the port interface circuitry 820 of a CRF is coupled to a modified forwarding table 1100 and a CRF table 1000, whereas the trunk interface circuitry 860 of a BRF is coupled to a VLAN table 900, in addition to the modified forwarding table 1100 and CRF table 1000. The trunk interface circuitry 860 comprises a MAC interface circuit 862 coupled to a switch fabric interface (SF) device 868 by way of trunk encapsulation (ENCAP) and decapsulation (DECAP) circuits 864 and 866. These latter circuits encapsulate/decapsulate frames with information that is forwarded over/received from the trunks, as described further herein. The MAC interface 862 provides an IEEE 802.x service layer for moving frames to and from the trunking links, whereas the SF device 868 is configured to perform data buffering and frame manipulation, as well as filtering, look-up and forwarding decision operations using the tables.

Each CRF and BRF of the distributed TR bridge is assigned an individual VLAN in a "2-tier" arrangement. That is, each CRF is assigned a VLAN identification (ID) and the logically-coupled BRF is assigned its own overlapping/encompassing VLAN ID. FIG. 9 is a schematic diagram of the VLAN table 900 used by the trunk interface circuitry to acquire information (such as CRF VLAN IDs) pertaining to TR frames flowing through the circuitry. The VLAN table 900 comprises a plurality of entries 902 indexed by a source (CRF) VLAN ID carried with each frame. Each entry preferably contains, inter alia, a field 910 containing a VLAN ID of a BRF associated with the source VLAN ID, a field 912 containing the BN of the BRF and a field 914 containing the RN of the source VLAN ID.

Referring again to FIG. 8, the port interface circuitry 820 comprises a Quad Medium access control (QM) device 822 and a Quad Switch fabric interface (QS) device 824, the latter of which is coupled to the modified forwarding table 1100 and the CRF table 1000. Each QS device 824 preferably services four (4) ports via a QM device 822. The QM 822 comprises MAC circuitry that preferably provides an IEEE 802.5 service layer for moving the frames to and from the TR segments; more specifically, the MAC capability allows attachment of the switch to a network entity, such as a processor or similar circuit that interfaces with LAN medium connections. The QS 824 is preferably a multi-port switching device configured to perform data buffering and frame manipulation, as well as filtering, look-up and forwarding decision operations using the tables. Accordingly, the forwarding decision circuitry embodied in the QS and SF devices is actually distributed and, thus, collectively these circuits provide the "intelligence" for switching and bridging frames throughout the TR bridge in a distributed switching processing arrangement.

Although the modified forwarding table and CRF table are shown as shared among the four QS/QM ports, these tables may be distributed in a manner such that there is only one modified forwarding table and one CRF table (along with one VLAN table) per switch. FIG. 10 is a schematic diagram of the CRF table 1000 which comprises a plurality of entries 1002 indexed by the RN of a CRF and which, for each entry, contains (i) a valid bit field 1010 whose content indicates whether the RN corresponds to a CRF associated with a particular BRF and (ii) a field 1012 containing the CRF VLAN ID corresponding to the CRF RN. The port and trunk interface circuitry process an incoming frame by, inter alia, performing look-up operations into the CRF and modified forwarding tables to enable rendering of a forwarding/switching decision over the distributed bridge as described further herein.

Figure 11:
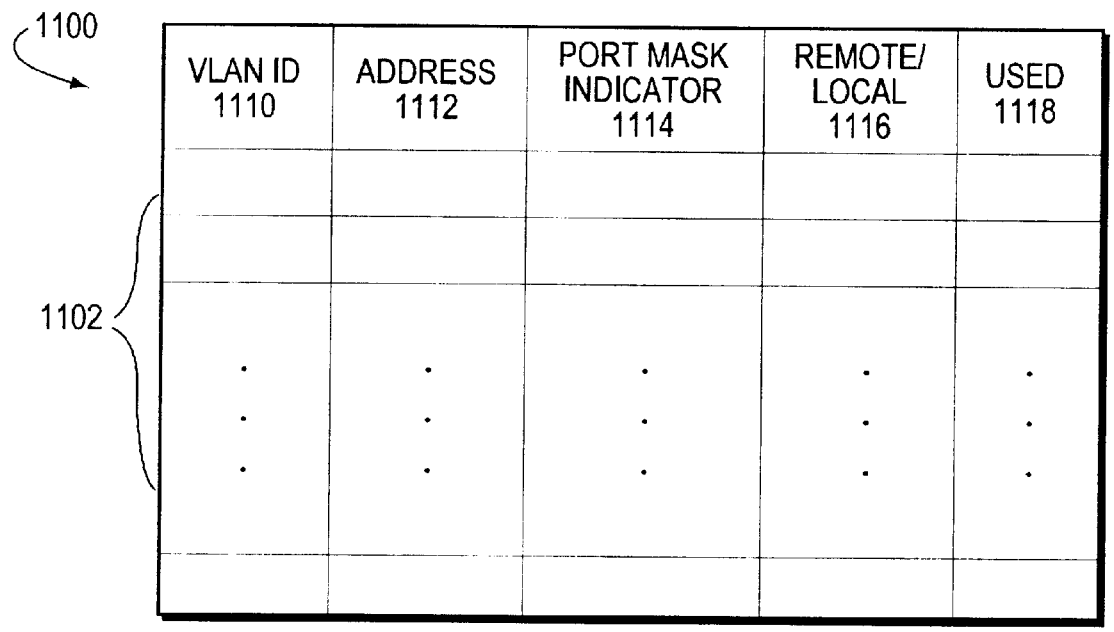
FIG. 11 is a schematic block diagram of an illustrative embodiment of a modified forwarding table used to select a destination port or ports for receiving a TR frame act according to the present invention.

FIG. 11 is a schematic block diagram of an illustrative embodiment of the modified forwarding table 1100 having a plurality of entries 1102 used to select a destination port or ports for receiving a frame. For this embodiment of the invention, each entry of the forwarding table preferably contains (1) a VLAN ID field 1110; (2) an address (a MAC or route descriptor, RD) field 1112; (3) an indicator, such as a port bit mask (per switch), field 1114 indicating which ports should receive the frame within the switch; (4) a "remote/local" field 1116 containing a bit that indicates the direction of the address; and (5) a "used" field 1118 containing a bit for aging-out the entry. Each time the entry is accessed or "used", the used bit is asserted. Execution of a conventional aging algorithm results in the examination of the state of this bit when determining which entries to "age" or delete from the table.

Examples of a mechanism used to "look-up" an entry in the forwarding table 1100 may include a hash table, a tree and a content addressable memory. However, it will be apparent to those skilled in the art that the actual mechanism is implementation-dependent and, thus, further examples are contemplated by the invention. The keys used for such look-up operations are preferably the VLAN ID and address fields contents. As noted, a configuration synchronization protocol may be employed to update each forwarding table associated with each switch (or port interface circuit) to ensure their consistency and coherency.

In the illustrative embodiment, inbound frame parsing operations, along with inbound frame forwarding operations, for an incoming TR frame are rendered at the port interface circuitry (or trunking interface circuitry) of an inbound port receiving the frame. As described herein, the inbound frame forwarding operations comprise both learning and destination selection (i.e., forwarding decision) operations. The forwarding decision rendered by the port interface circuitry may be carried over the trunking link (if necessary) to the distributed portions of the TR switching bridge environment. In addition, outbound frame processing operations are performed by an outbound port when the incoming frame is copied to that latter port.

Inbound Frame Processing

Inbound frame parsing is performed on frames received from an external interface of a switch to compute the destination and source VLANs, along with the destination and source addresses, used for learning and destination selection. This computed information is carried with the incoming frame and used by the port or trunk interface circuitry to access the appropriate table (e.g., the modified forwarding table 1100) when rendering a forwarding decision for the frame. For each inbound TR port, the port's CRF RN, its associated BRF BN, the corresponding VLAN ID of the BRF and a CRF-to-BRF spanning tree state (forwarding or blocking) are defined in local registers in the port interface circuitry (QS) of the port. The VLAN ID corresponding to the CRF RN may be obtained from the CRF table 1000 coupled to the port interface circuitry 820. For each inbound trunk port, the source port's CRF RN, its associated BRF BN and the corresponding VLAN ID of the BRF may be obtained from the VLAN table 900; the source CRF VLAN ID is passed with the received frame.

According to the invention, the actual processing required for inbound frame parsing depends upon the type of frame being forwarded by the port; these frame types include Non-Source Route (NSR), All Routes Explorer (ARE), Spanning Tree Explorer (STE) and Specifically Routed Frame (SRF). For example, if the frame is an ARE, STE or SRF frame, the port interface circuitry located on each inbound port analyzes the RIF of the incoming frame prior to computing the source and destination address and VLAN information. If, on the other hand, the frame is an NSR frame, the computed address and VLAN information further depends upon the bridging type of the distributed bridge. Moreover if the RIF length is "2" for either an STE or ARE frame, the RIF is updated by increasing its length to "4" and appending the RN of the inbound, entry port (source CRF RN) plus 4 bits of zero after the old RIF.

NSR Inbound Processing

If the switches of the distributed TR bridge are SRT-compliant, then the source and destination VLANs comprise the VLAN ID of the BRF coupled to the CRF of the inbound port. If the switches are SRB-compliant, then the source and destination VLANs comprise the VLAN ID of the inbound port's CRF. In either case, the source address is the SA of the incoming frame and the destination address is the DA of the incoming frame. FIG. 12 is a schematic diagram of Table 1 which summarizes the activity involved in processing incoming NSR frames.

ARE Inbound Processing

Figures 1, 2:
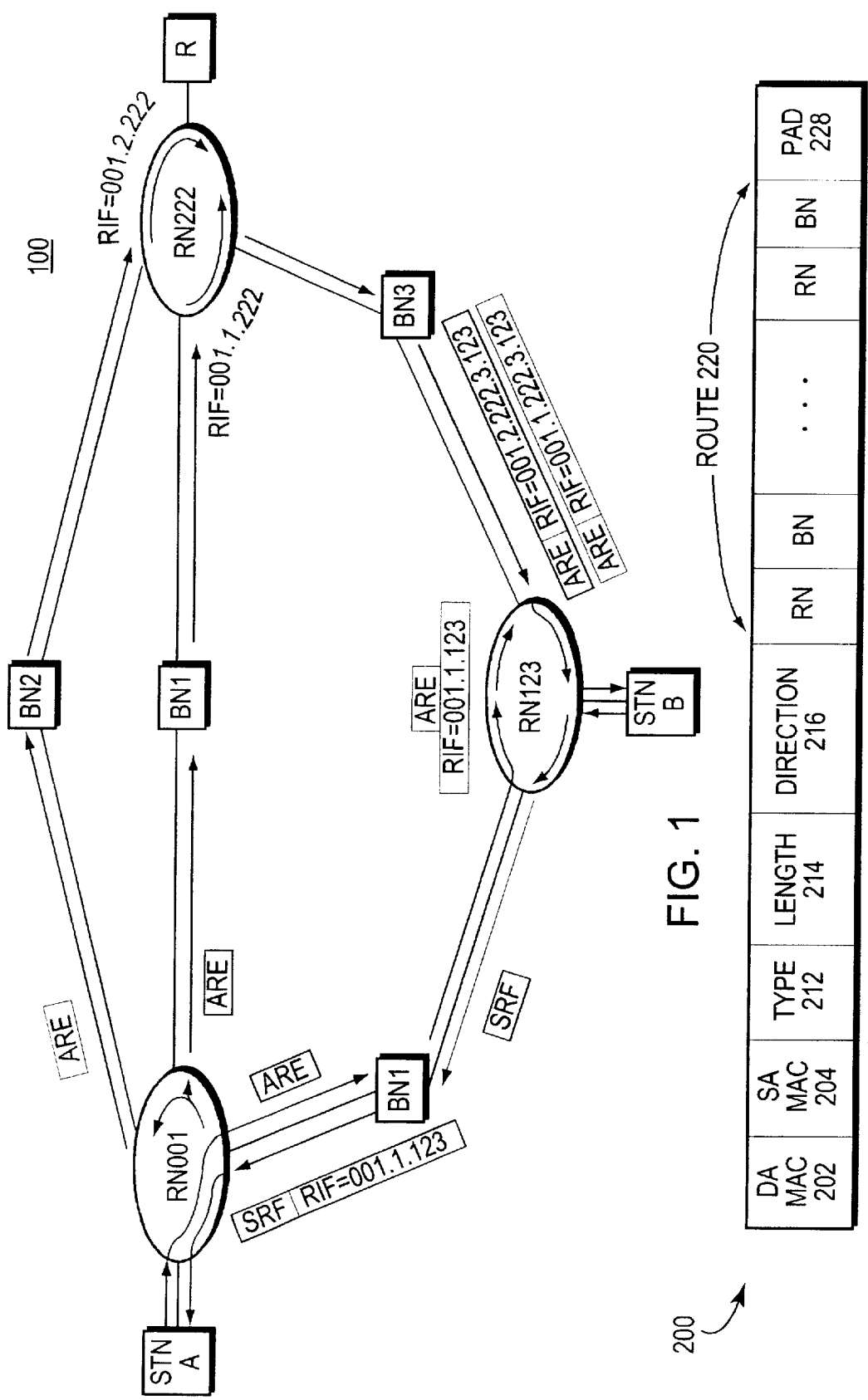
FIG. 1 is a schematic block diagram of a conventional Token Ring (TR) internetwork comprising a plurality of TR local area networks interconnected by conventional bridges and a router.
FIG. 2 is a schematic diagram of a portion of a conventional TR frame.
Figure 3:
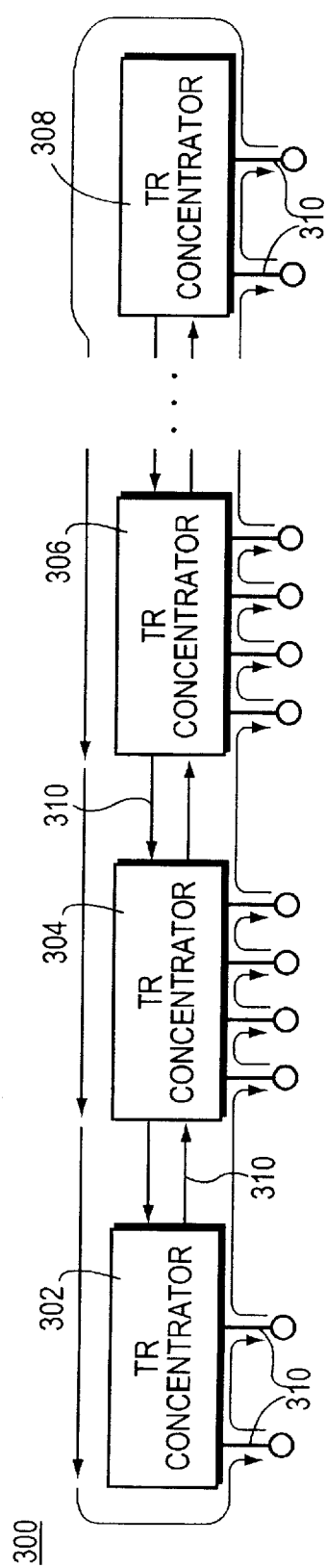
FIG. 3 is a schematic diagram of a conventional TR concentrator network arrangement.
Figure 4:
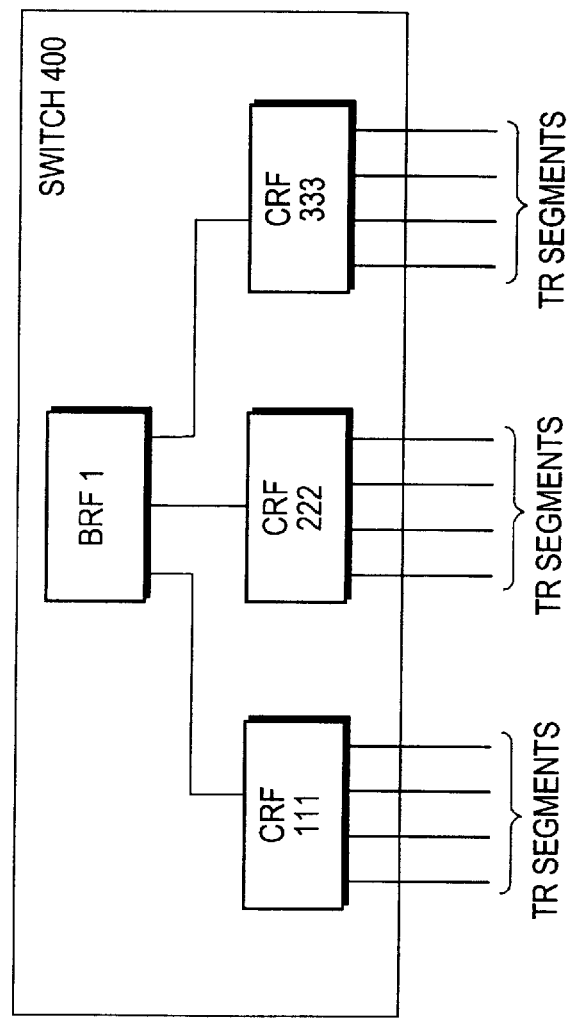
FIG. 4 is a schematic diagram of a switch containing a plurality of Concentrator Relay Functions (CRFs) coupled to a Bridge Relay Function (BRF) to provide bridging and switching operations among physical TR media/segments coupled to a switch.

FIG. 13 is a schematic diagram of Table 2 summarizing the activity involved in processing incoming ARE frames. The inbound port circuitry scans the RIF of an ARE frame to determine (1) the number of RNs in the RIF, (2) the position of its source CRF RN within the RIF and (3) whether ARE reduction is necessary. Note that the RIF (210 at FIG. 2) is scanned left-to-right starting with the left-most RN. If the number of RNs in the RIF=0 (denoting that the frame is generated by an endstation coupled to the inbound port), then the source VLAN is the VLAN ID of the inbound port's CRF, the destination VLAN is the VLAN ID of the BRF coupled to the inbound port's CRF, the source address is the SA of the incoming frame and the destination address is not applicable (N/A). If the number of RNs in the RIF>0 and the source CRF RN is not found in the RIF, then the frame is discarded; similarly, if the number of RNs in the RIF>0 and the source CRF RN is not the last RN in the RIF, the frame is discarded.

If the number of RNs in the RIF=1 and the source CRF RN is located in the first position of the RIF, then the source VLAN is the VLAN ID of the inbound port's CRF, the destination VLAN is the VLAN ID of the BRF coupled to the inbound port's CRF, the source address is the SA of the incoming frame and the destination address is N/A. If the number of RNs in the RIF>1, the source CRF RN is located in the last position of the RIF and the RN of a CRF coupled to the BRF is found in the RIF, then ARE reduction is necessary and the source and destination VLANs are the VLAN ID of the inbound port's CRF, the source address is the RD prior to the source CRF RD and the destination address is N/A. Lastly, if the number of RNs in the RIF>1, the source CRF RN is located in the last position of the RIF and the RN of a CRF coupled to the BRF is not found in the RIF, then the source VLAN is the VLAN ID of the inbound port's CRF, the destination VLAN is the VLAN ID of the BRF coupled to the inbound port's CRF, the source address is the RD prior to the source CRF RD and the destination address is N/A.

STE Inbound Processing

The inbound port circuitry scans the RIF of the STE frame to determine (1) the number of RNs in the RIF and (2) the position of its source CRF RN within the RIF. The CRF-to-BRF spanning tree state is determined from local registers in the QS of a TR port (or alternatively from the VLAN table, in the case of a trunk). If the number of RNs in the RIF=0 and the spanning tree state is blocked, then the source and destination VLANs are the VLAN ID of the inbound port's CRF, the source address is the SA of the incoming frame and the destination address is N/A. However, if the number of RNs in the RIF=0 and the spanning tree state is forwarding, then the source VLAN is the VLAN ID of the inbound port's CRF, the destination VLAN is the VLAN ID of the BRF coupled to the inbound port's CRF, the source address is the SA of the incoming frame and the destination address is N/A. As with the ARE frame analysis, if the number of RNs in the RIF>0 and the source CRF RN is either not found in the RIF or not the last RN in the RIF, then the frame is discarded.

If the number of RNs in the RIF=1, the source CRF RN is located in the first position of the RIF and the spanning tree state is blocking, then the source and destination VLANs are the VLAN ID of the inbound port's CRF, the source address is the SA of the incoming frame and the destination address is N/A. Yet if the number of RNs in the RIF=1, the source CRF RN is located in the first position of the RIF and the spanning tree state is forwarding, then the source VLAN is the VLAN ID of the inbound port's CRF, the destination VLAN is the VLAN ID of the BRF coupled to the inbound port's CRF, the source address is the SA of the incoming frame and the destination address is N/A.

If the number of RNs in the RIF>1, the source CRF RN is located in the last position of the RIF and the spanning tree state is blocking, then the source and destination VLANs are the VLAN ID of the inbound port's CRF, the source address is the RD prior to the source CRF RD and the destination address is N/A. Lastly, if the number of RNs in the RIF>1, the source CRF RN is located in the last position of the RIF and the spanning tree state is forwarding, then the source VLAN is the VLAN ID of the inbound port's CRF, the destination VLAN is the VLAN ID of the BRF coupled to the inbound port's CRF, the source address is the RD prior to the source CRF RD and the destination address is N/A. FIG. 14 is a schematic diagram of Table 3 summarizing the activity involved in processing incoming STE frames.

SRF Inbound Processing

FIG. 15 is a schematic diagram of Table 4 summarizing the activity involved in processing incoming SRF frames. The inbound port circuitry scans the RIF of the SRF frame to determine (1) the number of RNs in the RIF, (2) the position of its source CRF RN within the RIF, (3) whether the BRF BN immediately following the source CRF RN is the inbound port's BRF (i.e., is the BRF logically associated with inbound CRF), and (4) whether the CRF RN immediately following inbound port's BRF BN is (logically) coupled to the BRF. If the direction bit (216 at FIG. 2) is non-asserted (i.e., 0), the RIF 210 is scanned left-to-right starting with the left-most RN; however, if the direction bit is asserted (i.e., 1), the RIF is scanned right-to-left starting with the right-most RN. If the number of RNs in the RIF=0, then the source and destination VLANs are the VLAN ID of the inbound port's CRF, the source address is the SA of the incoming frame and the destination address is the DA of the incoming frame. If the number of RNs in the RIF=1, or if the number of RNs in the RIF=1–14 and the source CRF RN is not found in the RIF, then the frame is discarded.

If the number of RNs in the RIF=2–14, the source CRF RN is located in the first position of the RIF and the inbound port's BRF BN does not immediately follow the source CRF RN in the RIF, then the source and destination VLANs are the VLAN ID of the inbound port's CRF, the source address is the SA of the incoming frame and the destination address is the RD after the source CRF RD. If the number of RNs in the RIF=2–14, the source CRF RN is located in the first position of the RIF, the inbound port's BRF BN immediately follows the source CRF RN in the RIF and the CRF immediately following inbound port's BRF BN is not coupled to that BRF, then the source and destination VLANs are the VLAN ID of the inbound port's CRF, the source address is the SA of the incoming frame and the destination address is the RD after the source CRF RD.

If the number of RNs in the RIF=2, the source CRF RN is located in the first position of the RIF, the inbound port's BRF BN immediately follows the source CRF RN in the RIF and the CRF immediately following inbound port's BRF BN is coupled to that BRF, then the source VLAN is the VLAN ID of the inbound port's CRF, the destination VLAN is the VLAN ID of the immediately-following CRF, the source address is the SA of the incoming frame and the destination address is the DA of the incoming frame. If the number of RNs in the RIF=3–14, the source CRF RN is located in the first position of the RIF, the inbound port's BRF BN immediately follows the source CRF RN in the RIF and the CRF immediately following inbound port's BRF BN is coupled to that BRF, then the source VLAN is the VLAN ID of the inbound port's CRF, the destination VLAN is the VLAN ID of the immediately-following CRF, the source address is the SA of the incoming frame and the destination address is the RD occupying the third position in the RIF. If the number of RNs in the RIF=2–14 and the source CRF RN is located in the last position (N) of the RIF, then the source and destination VLANs are the VLAN ID of the inbound port's CRF, the source address is the RD prior to the source CRF RD and the destination address is the DA of the incoming frame.

If the number of RNs in the RIF=3–14, the source CRF RN is located in positions 2 thru (N–1) of the RIF and the inbound port's BRF does not immediately follow the source CRF RN in the RIF, then the source and destination VLANs are the VLAN ID of the inbound port's CRF, the source address is the RD prior to the source CRF RD and the destination address is the RD after the source CRF RD. If the number of RNs in the RIF=3–14, the source CRF RN is located in positions 2 thru (N–1) of the RIF, the inbound port's BRF immediately follows the source CRF RN in the RIF and the CRF immediately following inbound port's BRF is not coupled to that BRF, then the source and destination VLANs are the VLAN ID of the inbound port's CRF, the source address is the RD prior to the source CRF RD and the destination address is the RD after the source CRF RD.

If the number of RNs in the RIF=3–14, the source CRF RN is located in position (N–1) of the RIF, the inbound port's BRF immediately follows the source CRF RN in the RIF and the CRF immediately following inbound port's BRF is coupled to that BRF, then the source VLAN is the VLAN ID of the inbound port's CRF, the destination VLAN is the VLAN ID of the last RD's CRF, the source address is the RD prior to the source CRF RD and the destination address is the DA of the incoming frame. Lastly, if the number of RNs in the RIF=1–14, the source CRF RN is located in positions 2 thru (N–2) of the RIF, the inbound port's BRF immediately follows the source CRF RN in the RIF and the CRF immediately following inbound port's BRF is coupled to that BRF, then the source VLAN is the VLAN ID of the inbound port's CRF, the destination VLAN is the VLAN ID of the CRF in the RD after the source CRF RD, the source address is the RD prior to the source CRF RD and the destination address is the second RD after the source CRF RD.

Inbound Frame Forwarding

After parsing the frame to select the destination and source VLAN IDs and addresses for receiving the frame, the port or trunk interface circuitry of an inbound port performs the following learning and forwarding decision operations.

Source Learning

The interface circuitry uses the combination of source VLAN and source address information computed during the inbound frame processing stage and carried with the frame to access the modified forwarding table and determine whether that combination is previously known (stored) in the table. If an entry is not found in the table that matches the combination, a new entry is created containing the source VLAN, source address and the inbound port number, and the state of the remote/local bit of the entry is marked local. If an entry is found that matches the source VLAN and source address information combination, the remote/local bit is checked to ensure that it is marked local and the inbound port number matches this port. Finally, the used bit is asserted to prevent the entry from being aged-out. Whenever an entry is created or modified and marked as local, an entry for the same VLAN and address may be created or overwritten in the forwarding table of other ports on the switch and marked as remote with the inbound port's number placed in the destination port mask. This can be performed by a general purpose processor in the switch.

Forwarding Decision

If no destination address is selected (as in the case of ARE and STE inbound processing), then no lookup is performed and the destination port mask is set to that defined for the specified destination VLAN (i.e., all ports in the BRF or the entry port's CRF). On the other hand, if a destination address is selected (as in the case of NSR and SRF inbound processing), then a lookup operation is performed in the modified forwarding table using the combination of destination VLAN and destination address. If no entry is found in the table 1100 for the combination, the destination port mask 1114 is set to that defined for the specified destination VLAN (i.e., all ports in the BRF, the entry port's CRF or another CRF in that BRF). If an entry is found that is marked local, then the incoming frame is discarded. If an entry is found that is marked remote, the destination port mask is set to that defined in the entry (i.e., a specific learned port, a permanent configured entry, etc.).

Outbound Frame Processing

When a frame is copied to an outbound port, the following processing is performed based on the frame type and the type of link.

Access TR Port

If the frame is an SRF or NSR frame, the frame is sent as received from the inbound port. If the frame is an STE or ARE frame and the source VLAN is different from the exit port's CRF VLAN, then the RIF length is incremented by "2", the last 4 bits of the previous RIF are overwritten with the BRF's BN and the exit port's RN (plus 4 bits of zero) are added to the end of the RIF. If the source VLAN is the same as the exit port's CRF VLAN and the RIF length is equal "4" (for an STE or ARE frame), then the RIF length is reduced to "2" and the last 2 bytes of the RIF are discarded. If the source VLAN is the same as the exit port's CRF VLAN and the RIF length not equal to "4" (for an STE or ARE frame), then the frame is sent as received from the inbound port.

Trunk Port

The source VLAN is sent as a header followed by the actual frame contents. In addition, the destination VLAN, destination address and source address may optionally be carried as well to simplify the circuitry on the inbound side of the next trunk interface circuit 860.

Operation of the Distributed TR Bridge

Refer now to FIGS. 6–15 for a discussion of the operation of the TR bridge distributed in a switched fabric according to the present invention. Each switch of the distributed TR bridge is preferably configured in a similar manner; that is, each switch has a bridging type that is either SRB or SRT compliant. Execution of the conventional spanning tree algorithm results in a trunking port of SW3 being blocked (as denoted by X). Each switch SW1–3 has its own independently-constructed, modified forwarding table 1100.

An incoming NSR frame is received at an inbound port 8 of CRF999 on SW2 which is configured as an SRT-type bridging switch. Referring to Table 1, inbound frame parsing on the NSR frame results in the source and destination VLANs being the VLAN ID of the BRF coupled to the CRF of the inbound port, the source address being the SA of the incoming frame and the destination address being the DA of the incoming frame; this information is carried with the NSR frame and used by the port interface circuitry 820 to access the modified forwarding table 1100 when rendering a forwarding decision for the frame. Specifically, the source MAC address of the NSR frame is E and the destination MAC address is Y, which is coupled to Port 1 on CRF999 but on a different switch SW1. SW2,3 of the distributed bridge have not yet "learned" of destination Y, but the modified forwarding table of SW1 has an entry for destination MAC address Y. In addition, the source and destination VLANs carried with the frame are the VLAN ID of BRF2.

According to the inbound frame forwarding rules, a destination address is selected (in the case of NSR inbound processing) and a lookup operation is performed in the modified forwarding table 1100 using the combination of destination VLAN and destination address. However, no entry is found in the table for the combination because Y has not been learned by SW2; accordingly, the destination port mask 1114 is set to that defined for the specified destination VLAN (i.e., all ports in the BRF). Also, since the frame is an NSR frame, outbound frame processing rules specify that the frame is sent as received from the inbound port.

The port interface circuitry 820 also accesses the modified forwarding table 1100 using a combination of source VLAN and source address information computed during the inbound frame processing stage to determine whether that combination is previously known (learned) in the table. If an entry is not found in the table that matches the combination, a new entry 1102 is created containing the source VLAN ID for CRF999, source address E and the inbound port 8, the state of the remote/local bit of the entry is marked local, and the used bit is asserted to prevent the entry from being aged-out. If an entry is found that matches the source VLAN and source address information combination, the remote/ local bit is further checked to ensure that it is marked local. When an entry is created, an entry can also be created for VLAN ID of CRF999 and address E in the forwarding table of the other ports on SW2, and that entry can be marked as remote with the destination port mask set to port 8.

The NSR frame received at the inbound port 8 of SW2 is then "flooded" to all ports in BRF2. In particular, the incoming frame is forwarded from CRF999 to BRF2 of SW2, where copies of the frame are generated and switched through all ports of CRF999, CRF222 and CRF888; in addition, copies of the frame are forwarded through the appropriate trunk interface circuits 860 and over trunk links TL1,3 coupling the distributed switches SW1–3. Prior to forwarding over the trunking links, the TR frame is encapsulated with a trunking header that stores, inter alia, the source VLAN which may be used for learning purposes. In the illustrative embodiment, the trunk links are ISL links and the trunk header is a TR-ISL header; accordingly, the destination VLAN, destination address and source address are also carried in the header. Copies of the encapsulated frame are then forwarded by SW2 over the trunk links TL1,3 to SW1,3.

As noted, SW3 has not yet learned of destination Y so that when the encapsulated frame is received at the trunk interface circuitry 860 of the switch, the destination port mask 1114 is set to that defined for the specified destination VLAN (i.e., all ports in BRF2), and copies of the frame are generated and flooded through all ports of CRF888 and CRF777 of the switch. On the other hand, the forwarding table 1100 of SW1 has an entry for MAC address Y because it is coupled to Port 1 on CRF999 of SW1. The trunk interface circuitry 860 accesses the forwarding table using the combination of destination VLAN and destination address, and determines that the port number associated with that destination is, e.g., Port 1 of CRF999; the frame is then forwarded to that port.

In response to observing a frame flowing from MAC address Y across trunk link TL1 to a CRF port on SW2, an entry 1102 is generated in the modified forwarding table 1100 for MAC address Y having an associated port mask of TL1. An entry for address Y and this VLAN is also created in the modified forwarding table 1100 for each of the other ports (e.g., port 8) of SW2 and the entry is marked as remote with the destination port mask set to TL1. The next time an NSR frame is received at an inbound port of SW2, the port circuitry determines that the port mask indicator 1114 for destination MAC address Y is the trunk port TL1 and, accordingly, the frame is forwarded only over that link to SW1.

Assume now an SRF frame is received at the inbound port 8 of CRF999 on SW2. The RIF of the SRF is used to forward the frame and includes the following routing information: <999.2.888>(i.e., CRF999, BRF2 and CRF888). In addition, the destination MAC address of the SRF frame is Z. Based on the contents of the RIF; it may be inferred that destination Z is a station coupled to a port of CRF888; however, CRF888 is distributed among SW2 and 3. A forwarding decision must therefore be rendered to determine which switch receives the frame. The forwarding decision generally determines whether the frame is forwarded through a BRF or strictly within a CRF; that is, when a frame is received at an inbound port, a decision is made as to which CRF the incoming frame is targeted: (1) to the CRF associated with the inbound port, whether it is physically located in the inbound switch or logically associated with a CRF of another distributed switch; or (2) to a CRF that is logically coupled to a BRF elsewhere in the distributed bridge.

According to SRF inbound processing, the inbound port circuitry scans the RIF <999.2.111> of the SRF frame and determines that (1) there are two RNs in the RIF, (2) the position of its source CRF RN within the RIF is first, (3) the BRF BN immediately following the source CRF RN is logically associated with its inbound port's CRF, and (4) the CRF RN immediately following the BRF BN is coupled to the BRF. Referring to Table 4, inbound frame parsing on the SRF frame results in the source VLAN being the VLAN ID of CRF999, the destination VLAN being the VLAN ID of CRF888, the source address being E and the destination address being Z. This information is carried with the SRF frame and used by the port interface circuitry 820 to access the modified forwarding table 1100 when rendering a forwarding decision for the frame.

A lookup operation is then performed in the forwarding table using the combination of destination VLAN and destination address. Assume an entry for MAC address Z (and the destination VLAN ID) was learned from a previous frame and is thus stored in the table; the entry Z thus includes, inter alia, a port bit mask 1114 indicating that the trunk link TL3 should receive the frame and the SRF frame is forwarded through BRF2 of the distributed bridge and onto CRF888 in SW3, as specified by the destination VLAN ID. If there is not an entry for MAC address Z and the destination VLAN in the forwarding table 1100, the inbound port forwards the frame from CRF999 to its BRF2, where the frame is flooded over all links associated with the VLAN ID of CRF888. In contrast to the NSR frame situation where an unknown destination VLAN and address causes the frame to be flooded throughout the entire switch, the RIF of the SRF frame is used to specify the target VLAN ID of CRF888; accordingly, the flooding operation is limited to a "multicast-type" transfer. Because VLAN ID of CRF888 is associated with SW2 and 3, BRF2 of SW2 forwards the SRF frame only over trunk link TL3 to SW3 and onto CRF888. A configuration table, e.g., the VLAN table 900, is used in this case to determine where CRF888 is logically located in the distributed bridge; alternatively, the flooding operation may be extended to all trunks of the bridge.

Figure 16:
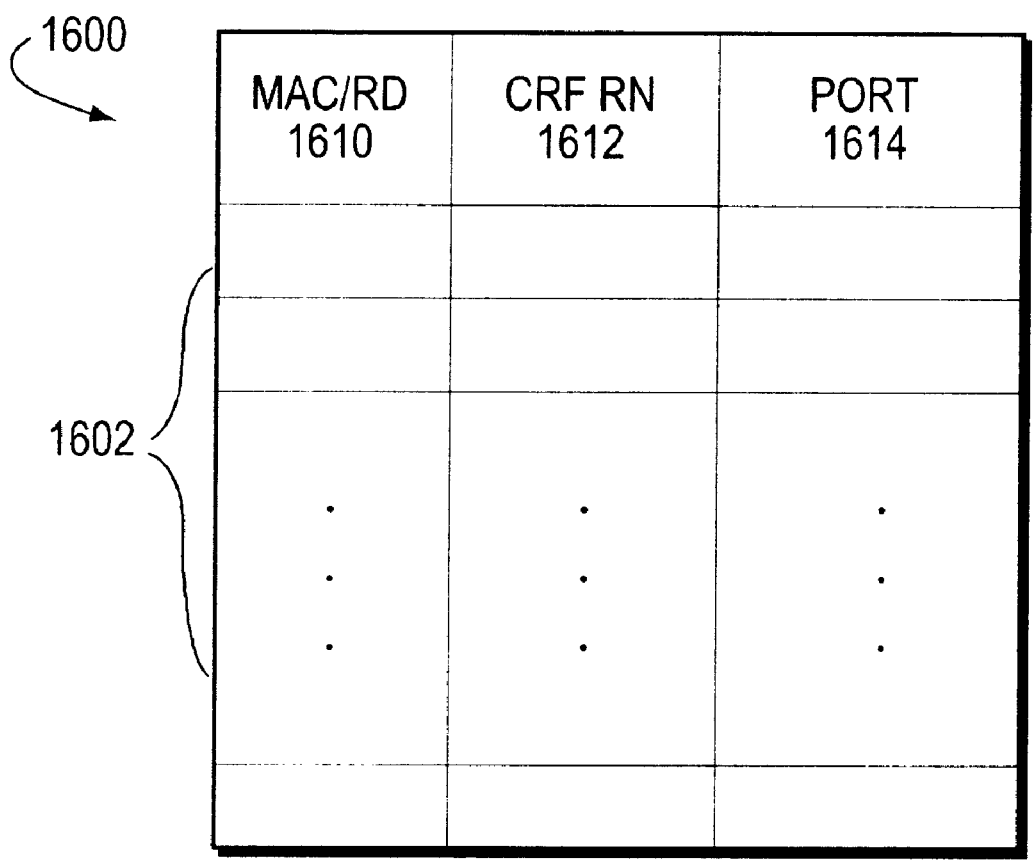
FIG. 16 is a schematic diagram of an alternate embodiment of a forwarding table modified for the distributed TR bridge environment in accordance with the present invention.

While there has been shown and described an illustrative embodiment of a distributed TR bridge having a logical switch fabric that is distributed over a TR switching network of switches interconnected by trunk links, it is to be understood that various other adaptations and modifications may be made within the spirit and scope of the invention. For example, in an alternate embodiment of the invention, a generic forwarding table modified for a distributed TR bridge environment may be utilized in accordance is with the present invention. FIG. 16 is a schematic diagram of the alternate embodiment of the modified forwarding table 1600 containing a plurality of entries 1602, each having a MAC/RD field 1610, a Ring (CRF RN) field 1612 and a port number (Port) field 1614. A MAC/RD and Ring combination is used by the port circuitry to access the modified forwarding table of this embodiment to render a forwarding decision that specifies the output port or ports through which the frame should be switched.

Where the MAC/RD entry is an actual route descriptor (RN/BN pair), a unique triplet is specified by the RD and the contents of the Ring field 1612 of each forwarding table entry; this unique triplet specifies an exact location of a destination station. Whether a MAC or RD value is used for a look-up operation is determined by the length of the RIF after the matching source CRF RN. That is, if the CRF RN of the inbound port is followed by a BRF BN and a single CRF RN (which terminates the RIF), then the MAC address specifies the station on that terminating CRF RN. If, however, there are additional RD pairs following the matching source CRF RN of the inbound port, then that RD field is used to determine where to forward the incoming frame; this is because there may be an additional bridge coupled to a physical ring of a CRF and the destination may be further coupled to a ring connected to that bridge. Even if the RIF continues for many RD pairs after the matching source CRF RN, the unique triplet defined by the entry of the forwarding table specifies only one route for reaching the destination. Therefore, the RD following the terminating CRF is used as the look-up key into the forwarding table. The terminating CRF is also referred to as the exiting CRF (subsequent to the matching CRF).

As noted when the port circuitry of the inbound port scans the RIF, it first must determine where its source CRF RN is in the RIF. Thereafter, it determines whether the next BRF BN is logically coupled to the source CRF RN and whether the exiting CRF is logically coupled to the BRF. Finally, it determines the target destination coupled to the exiting CRF RN. If additional RD information follows the exiting CRF, then that RD information (BN/RN) is stored in the forwarding table rather than the MAC address. The additional RD information denotes that there is another bridge within the route and that, rather than the end station, the next bridge is the target destination. If there is no additional RD information in the RIF following the exiting CRF, the exiting CRF is, in fact, the last ring and the destination is the end station specified by the destination MAC address.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A distributed token ring (TR) bridge comprising:
   at least one trunk link;
   a plurality of switches coupled to the trunk link, each switch including (i) token ring port interface circuitry organized as at least one Concentrator Relay Function (CRF) to connect to a plurality of token ring local area networks and (ii) trunk interface circuitry interconnected between the port interface circuitry and the trunk link, the interconnected trunk interface circuitry further organized as a Bridge Relay Function (BRF) that is distributed among the plurality of switches to create a single logical switch fabric to interconnect token ring local area networks.

2. The distributed TR bridge of claim 1 wherein the port interface circuitry comprises:
   a first device that provides service layer for moving frames to and from TR media segments; and
   a second device coupled to the first device, the second device configured to perform data buffering and frame manipulation operations.

3. The distributed TR bridge of claim 2 wherein the first device is a quad medium access control (QM) device having a plurality of TR ports and wherein the second device is a quad switch fabric interface (QS) device that services the plurality of TR ports via the QM device.

4. The distributed TR bridge of claim 3 wherein the trunk interface circuitry comprises:
   a third device that provides a service layer for moving frames to and from the trunking link; and
   a fourth device coupled to the third device, the fourth device configured to perform data buffering and frame manipulation operations.

5. The distributed TR bridge of claim 4 wherein the third device is a medium access control (MAC) interface circuit coupled to the trunk link and wherein the fourth device is a switch fabric interface (SF) device.

6. The distributed TR bridge of claim 5 further comprising a virtual local area network (VLAN) table coupled to the SF device, the VLAN table used by the SF device to acquire information such as CRF VLAN identifiers (IDs) pertaining to frames flowing through the device.

7. The distributed TR bridge of claim 6 further comprising:
   a modified forwarding table coupled to each of the QS and SF devices, the modified forwarding table used by the devices to select destination ports for receiving the frames; and
   a CRF table coupled to each of the QS and SF devices, the CRF table providing information such as a VLAN ID corresponding to a CRF ring number.

8. A method for distributing a token ring (TR) bridge among a plurality of switches interconnected by trunk links, each switch including port interface circuitry having a plurality of ports for receiving incoming frames from a plurality of TR segments connected to the ports, each switch further including trunk interface circuitry connected to the trunk links, the method comprising the steps of:
   organizing (i) the port interface circuitry as a plurality of Concentrator Relay Functions (CRFs), the CRFs each having a plurality of ports, and each port to connect to a token ring local area network and (ii) the trunk interface circuitry as a Bridge Relay Function (BRF) to interconnect token ring local area networks;
   coupling the BRF to the CRFs; and
   distributing the BRF among the interconnected switches to create a single logical switch fabric that facilitates switching of frames among the ports of a CRF and bridging of the frames between CRFs coupled to the BRF.

9. The method of claim 8 further comprising the step of:
   parsing each incoming frame at the interface circuitry to compute information such as destination and source virtual local area network (VLAN) identifiers (IDs) along with destination and source addresses for the frame; and
   executing frame forwarding operations for the incoming frame at the interface circuitry using the computed information, the frame forwarding operations comprising source learning and forwarding decision operations.

10. The method of claim 9 wherein the step of parsing further comprises the step of processing each incoming frame depending upon a type of the frame forwarded by the interface circuitry.

11. The method of claim 10 wherein the types of frames include Non-Source Route (NSR), All Routes Explorer (ARE), Spanning Tree Explorer (STE) and Specifically Routed Frame (SRF).

12. The method of claim 11 wherein the step of processing comprises the step of, if the frame has an ARE, STE or SRF frame type:
   analyzing contents of a routing information field (RIF) of the frame at the port interface circuitry prior to computing the source and destination addresses and VLAN IDs.

13. The method of claim 12 wherein the step of processing comprises step of, if the frame is an NSR frame type:
   determining a bridging type of the distributed bridge prior to computing the source and destination addresses and VLAN IDs.

14. The method of claim 13 wherein, for source learning operations, the step of executing comprises the steps of:
   accessing a modified forwarding table having a plurality of entries using a combination of the computed source VLAN ID and source address; and determining whether the combination is stored in the modified forwarding table.

15. The method of claim 14 wherein the step of determining whether the combination is stored in the modified forwarding table comprises the steps of:
if an entry is not found in the table that matches the combination, creating a new entry containing the source VLAN ID, the source address and an inbound port number; and,
marking a state of a remote/local bit of the entry as local.

16. The method of claim 14 wherein the step of determining whether the combination is stored in the modified forwarding table comprises the steps of:
if an entry is found that matches the combination, checking a state of a remote/local bit to ensure that it is marked local;
checking that an inbound port number matches the port number of the port interface circuitry; and
asserting a used bit to prevent the entry from being aged-out.

17. The method of claim 16 wherein, for forwarding decision operations, the step of executing comprises the step of:
if the frame has an ARE or STE frame type, setting a destination port mask to that defined for a specified destination VLAN ID.

18. The method of claim 17 wherein, for forwarding decision operations, the step of executing comprises the steps of:
if the frame has an NSR or SRF frame type, accessing the modified forwarding table to perform a lookup operation using a combination of the computed destination VLAN ID and destination address; and
determining whether the combination is stored in the modified forwarding table.

19. The method of claim 18 wherein the step of determining whether the combination is stored in the modified forwarding table comprises the step of:
if an entry is not found in the table that matches the combination, setting the destination port mask to that defined for the specified destination VLAN.

20. The method of claim 19 wherein the step of determining whether the combination is stored in the modified forwarding table comprises the step of:
if an entry is found that matches the combination and that is marked local, discarding the frame; and
if an entry is found that matches the combination and that is marked remote, setting the destination port mask that defined in the entry.

21. A switch, comprising:
a plurality of token ring ports, each port configured to connect to a token ring local area network;
a trunk port to connect to a trunk link;
a bus;
token ring port interface circuitry, to interface with the plurality of token ring ports and enabling transfer of a frame between any token ring local area networks connected to the plurality of token ring ports, the token ring interface circuitry connected to the bus; and
trunk interface circuitry to interface with the trunk port, the trunk interface circuitry connected to the bus to enable frame switching between the trunk port and any one of the plurality of token ring ports.

22. The switch as in claim 21, further comprising:
the token ring port interface circuitry organizing the plurality of token ring ports as a Concentrator Relay Function (CRF).

23. The switch as in claim 21, further comprising:
the trunk interface circuitry organized as a Bridge Relay Function (BRF) for interoperation with other switches.

24. A method of operating a switch, comprising:
configuring a plurality of token ring ports, each port to connect to a token ring local area network;
configuring a trunk port to connect to a trunk link;
interfacing a token ring port interface circuitry with the plurality of token ring ports and enabling transfer of a frame between any token ring local area networks connected to the plurality of token ring ports, the token ring interface circuitry connected to a bus; and
interfacing a trunk interface circuitry with the trunk port, the trunk interface circuitry connected to the bus to enable frame switching between the trunk port and any one of the plurality of token ring ports.

25. The method as in claim 24, further comprising:
organizing the token ring port interface circuitry to connect the plurality of token ring ports as a Concentrator Relay Function (CRF).

26. The method as in claim 24, further comprising:
organizing the trunk interface circuitry as a Bridge Relay Function (BRF) for interoperation with other switches.

27. A switch, comprising:
a plurality of token ring ports, each port configured to connect to a token ring local area network;
a trunk port to connect to a trunk link;
a bus;
means for interfacing token ring port interface circuitry with the plurality of token ring ports and enabling transfer of a frame between any token ring local area networks connected to the plurality of token ring ports, the token ring interface circuitry connected to the bus; and
means for interfacing trunk interface circuitry with the trunk port, the trunk interface circuitry connected to the bus to enable frame switching between the trunk port and any one of the plurality of token ring ports.

28. A plurality of switches, comprising:
said plurality of switches interconnecting a plurality of token ring local area networks through at least one trunk link, where each switch has,
a plurality of token ring ports, each port configured to connect to a token ring local area network of said plurality of token ring local area networks;
a trunk port to connect to a said at least one trunk link;
a bus;
token ring port interface circuitry, to interface with the plurality of token ring ports and enabling transfer of a frame between any token ring local area networks, of said plurality of token ring local area networks, connected to the plurality of token ring ports, the token ring interface circuitry connected to the bus; and
trunk interface circuitry to interface with the trunk port, the trunk interface circuitry connected to the bus to enable frame switching between the trunk port and any one of the plurality of token ring ports.

29. A method for operating a plurality of switches, comprising:
said plurality of switches interconnecting a plurality of token ring networks, each switch of said plurality of switches operating according the steps of, at each switch of said plurality of switches, configuring a plurality of token ring ports, each port to connect to a token ring local area network of said plurality of token ring local area networks;

configuring at least one trunk port to connect to at least one trunk link;

interfacing a token ring port interface circuitry with the plurality of token ring ports and enabling transfer of a frame between any token ring local area networks of said plurality of token ring local area networks connected to the plurality of token ring ports, the token ring interface circuitry connected to a bus; and interfacing a trunk interface circuitry with said at least one trunk port, the trunk interface circuitry connected to the bus to enable frame switching between the trunk port and any one of the plurality of token ring ports, to enable frame switching through said at least one trunk link and between said plurality of token ring local area networks.

30. A computer readable media, comprising:

instructions for execution on a processor for the practice of the method of claim 1 or claim 24.

31. Electromagnetic signals propagating on a computer network, comprising:

the electromagnetic signals carrying instructions for execution on a processor for the practice of the method of claim 1 or claim 24.

* * * * *